United States Patent
Boulton

(10) Patent No.: US 10,984,102 B2
(45) Date of Patent: Apr. 20, 2021

(54) DETERMINING SECURITY RISKS IN BINARY SOFTWARE CODE

(71) Applicant: BlackBerry Limited, Waterloo (CA)

(72) Inventor: Adam John Boulton, Wirral (GB)

(73) Assignee: BlackBerry Limited, Waterloo (CA)

( * ) Notice: Subject to any disclaimer, the term of this patent is extended or adjusted under 35 U.S.C. 154(b) by 135 days.

(21) Appl. No.: 16/148,730

(22) Filed: Oct. 1, 2018

(65) Prior Publication Data

US 2020/0104492 A1    Apr. 2, 2020

(51) Int. Cl.
*G06F 21/00* (2013.01)
*G06F 21/56* (2013.01)
*G06F 21/57* (2013.01)

(52) U.S. Cl.
CPC .......... *G06F 21/563* (2013.01); *G06F 21/577* (2013.01); *G06F 2221/033* (2013.01)

(58) Field of Classification Search
CPC .... G06F 21/562; G06F 21/563; G06F 21/577; G06F 2221/033; G06F 8/30; G06F 8/60; G06F 8/65; G06F 8/20; G06F 8/70; G06F 8/75; G06F 8/77; G06F 8/53; H04L 63/1433
See application file for complete search history.

(56) References Cited

U.S. PATENT DOCUMENTS

| | | | |
|---|---|---|---|
| 8,479,161 B2* | 7/2013 | Weigert | G06F 8/75 717/124 |
| 8,713,684 B2 | 4/2014 | Bettini et al. | |
| 8,732,825 B2* | 5/2014 | Park | G06F 21/562 726/22 |
| 8,819,819 B1 | 8/2014 | Johnston et al. | |
| 9,329,846 B1* | 5/2016 | August | G06F 9/45525 |
| 9,386,463 B1* | 7/2016 | Contino | H04W 24/02 |
| 9,588,877 B1* | 3/2017 | Adir | G06F 11/3608 |

(Continued)

FOREIGN PATENT DOCUMENTS

| KR | 20150083627 | 7/2015 |
|---|---|---|
| WO | 2006039351 | 4/2006 |

OTHER PUBLICATIONS

Extended European Search Report issued in European Application No. 19200283.0 dated Nov. 12, 2019, 6 pages.

(Continued)

*Primary Examiner* — David Garcia Cervetti
(74) *Attorney, Agent, or Firm* — Fish & Richardson P.C.

(57) ABSTRACT

Systems, methods, and software can be used to analyze security risks of a set of binary software code based on its functional context. In some aspects, a computer-implemented method comprises: receiving, by a server, a set of binary software code; determining, by the server, a functional context of the set of binary software code; determining, by the server, a security risk assessment of the set of binary software code; retrieving, by the server, a plurality of security risk assessment of other software codes having a same functional context as the functional context of the set of binary software code; comparing, by the server, the security risk assessment of the set of binary software code and the plurality of security risk assessments of other software codes having the same functional context; and generating, by the server, a security notification indicating a result of the comparing.

17 Claims, 2 Drawing Sheets

(56) References Cited

U.S. PATENT DOCUMENTS

| | | |
|---|---|---|
| 9,652,617 B1 | 5/2017 | Evans et al. |
| 9,798,884 B1* | 10/2017 | Bishop, III ............ G06N 20/00 |
| 9,817,974 B1* | 11/2017 | Huang .................. G06F 21/566 |
| 10,162,966 B1* | 12/2018 | Huang .................. G06F 21/566 |
| 10,534,914 B2* | 1/2020 | Nakajima ............. G06F 21/563 |
| 10,657,262 B1 | 5/2020 | Cui et al. |
| 2003/0195861 A1 | 10/2003 | McClure et al. |
| 2003/0217039 A1 | 11/2003 | Kurtz et al. |
| 2004/0010703 A1* | 1/2004 | Kouznetsov ............ G06F 21/56 726/22 |
| 2004/0015728 A1 | 1/2004 | Cole et al. |
| 2004/0078384 A1 | 4/2004 | Keir et al. |
| 2006/0075468 A1 | 4/2006 | Boney |
| 2007/0011319 A1 | 1/2007 | McClure et al. |
| 2008/0109871 A1 | 5/2008 | Jacobs |
| 2008/0263659 A1 | 10/2008 | Alme |
| 2009/0144698 A1 | 6/2009 | Fanning et al. |
| 2010/0125913 A1* | 5/2010 | Davenport .......... H04L 63/1466 726/25 |
| 2010/0241469 A1 | 9/2010 | Weigert |
| 2010/0242028 A1 | 9/2010 | Weigert |
| 2010/0281248 A1* | 11/2010 | Lockhart ............... G06F 21/577 713/150 |
| 2011/0173693 A1* | 7/2011 | Wysopal ............... G06F 21/577 726/19 |
| 2012/0072968 A1* | 3/2012 | Wysopal ............. G06F 11/3612 726/1 |
| 2012/0144486 A1* | 6/2012 | Navaraj ............. H04L 63/1466 726/23 |
| 2013/0227683 A1 | 8/2013 | Bettini et al. |
| 2013/0298230 A1 | 11/2013 | Kumar et al. |
| 2015/0067148 A1* | 3/2015 | Kim ........................ H04L 67/12 709/224 |
| 2015/0172303 A1 | 6/2015 | Humble et al. |
| 2015/0248556 A1 | 9/2015 | Sickendick et al. |
| 2015/0254017 A1* | 9/2015 | Soja ...................... G06F 3/0622 711/103 |
| 2015/0261955 A1 | 9/2015 | Huang et al. |
| 2015/0377961 A1* | 12/2015 | Lin ....................... G06F 11/263 714/724 |
| 2016/0094564 A1* | 3/2016 | Mohandas ........... H04L 63/145 726/24 |
| 2016/0099963 A1* | 4/2016 | Mahaffey ........... H04L 63/0227 726/25 |
| 2016/0147517 A1* | 5/2016 | Vicovan .............. G06F 11/3636 717/140 |
| 2017/0111375 A1 | 4/2017 | Provos et al. |
| 2017/0180370 A1* | 6/2017 | Satoh ..................... G06F 21/566 |
| 2017/0262633 A1 | 9/2017 | Miserendino et al. |
| 2017/0286692 A1* | 10/2017 | Nakajima ............. G06F 21/563 |
| 2018/0025157 A1 | 1/2018 | Titonis et al. |
| 2018/0121659 A1 | 5/2018 | Sawhney et al. |
| 2018/0218157 A1 | 8/2018 | Price et al. |
| 2018/0225460 A1* | 8/2018 | Nakajima ............... G06F 21/57 |
| 2018/0260301 A1 | 9/2018 | Podjarny et al. |
| 2018/0349598 A1 | 12/2018 | Harel et al. |
| 2019/0050515 A1* | 2/2019 | Su ........................ G06N 3/0445 |
| 2019/0188392 A1 | 6/2019 | El-Moussa et al. |
| 2019/0243964 A1* | 8/2019 | Shukla ..................... G06F 21/54 |
| 2020/0097662 A1* | 3/2020 | Hufsmith ................ H04L 67/10 |
| 2020/0104490 A1 | 4/2020 | Boulton et al. |
| 2020/0104493 A1 | 4/2020 | Boulton |

OTHER PUBLICATIONS

Extended European Search Report issued in European Application No. 19200590.8 dated Oct. 30, 2019, 6 pages.

PCT International Search Report and Written Opinion in International Application No. PCT/EP2019/076,254, dated Jan. 3, 2020, 14 pages.

* cited by examiner

DETERMINING SECURITY RISKS IN BINARY SOFTWARE CODE

TECHNICAL FIELD

The present disclosure relates to determining security risks in binary software code.

BACKGROUND

In some cases, software services can be provided by executable binary software code. The binary software code is computer software in a binary format. The computer software can be application software, system software (e.g., an operating system or a device driver), or a component thereof. The binary software code can also be referred to as binary program code, executable code, or object code.

DESCRIPTION OF DRAWINGS

Like reference numbers and designations in the various drawings indicate like elements.

DETAILED DESCRIPTION

In some cases, a software developer can submit software code to a software service platform that is operated by a software provider. The software code can be executed on the software service platform to provide software services to user devices. Alternatively or additionally, the software code can be downloaded to user devices. The software service platform can be implemented in one or more servers, or on a cloud-computing platform.

In some implementations, the software service platform can inspect the software code to assess the security risks of the software code. Security risks can include malicious software code that would harm user devices, expose user information, or a combination thereof. Security risks can also include code that is vulnerable to malicious attacks.

Different software code may have different levels of vulnerability according to the function that the software code performs. For example, software code that performs network communication may have more vulnerability than software code that operates locally, e.g., controlling a break on a vehicle. Therefore, the evaluation of software security risks can be improved by comparing the security risk assessment of software code that performs similar functions.

Figure 1:
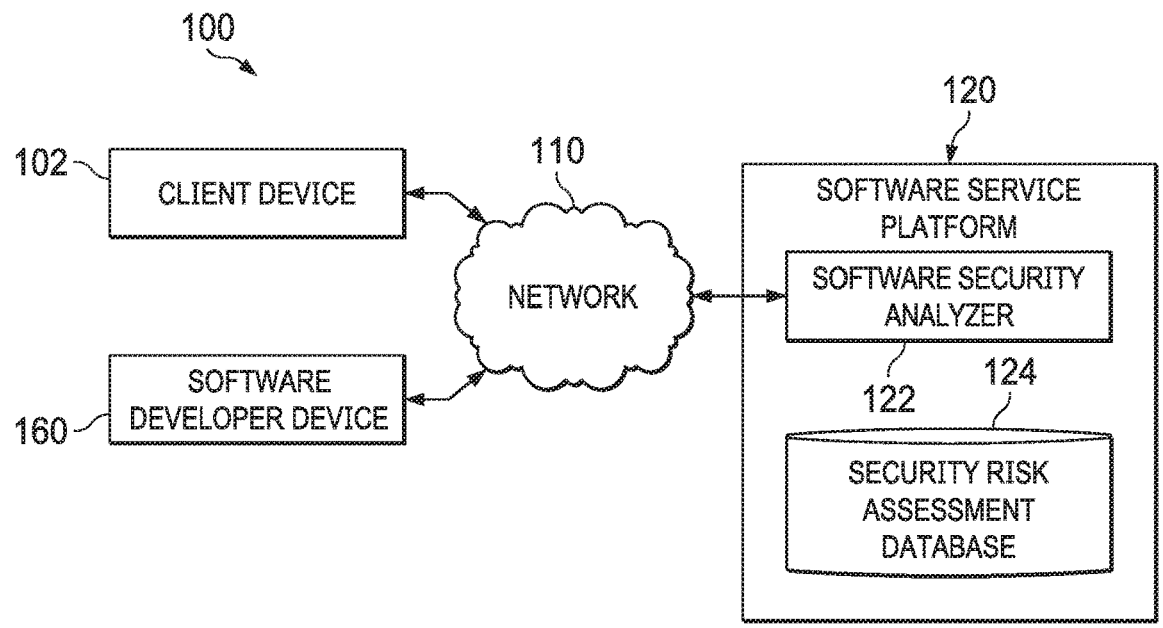
FIG. 1 is a schematic diagram showing an example communication system that analyzes security risks of binary software code based on its functional context, according to an implementation.
Figure 2:
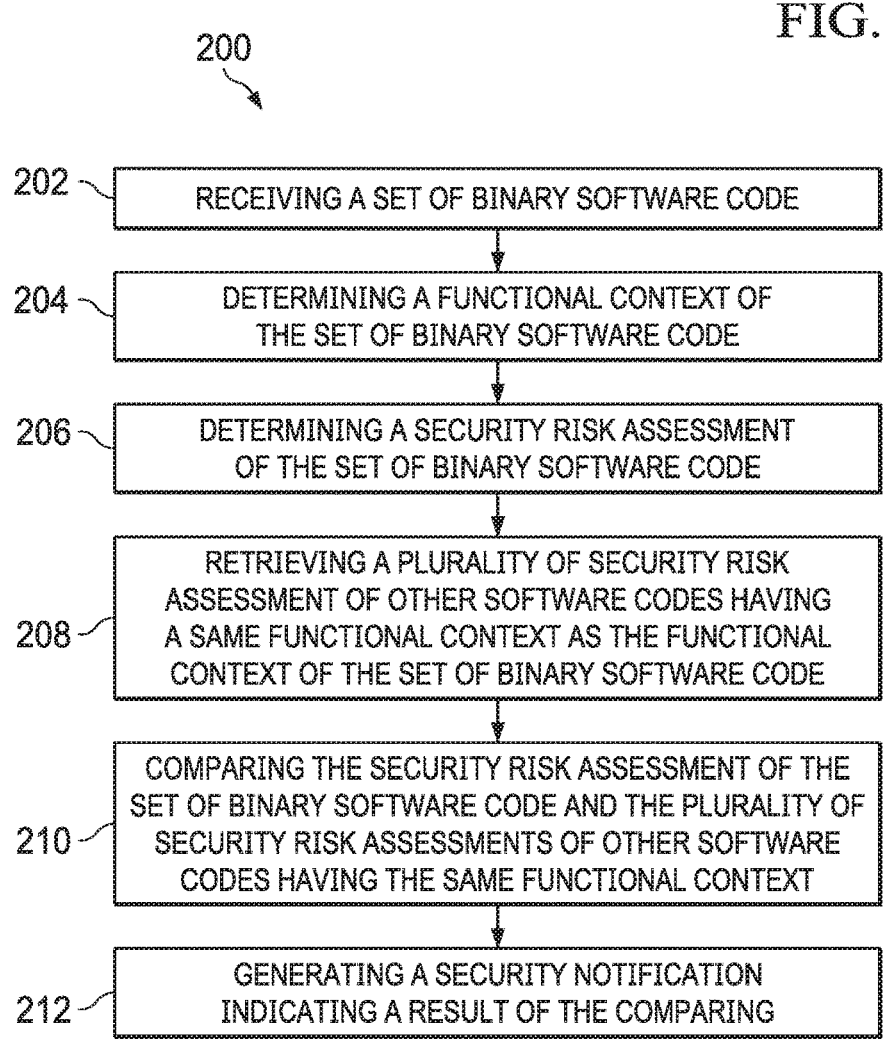
FIG. 2 is a flow diagram showing an example method that analyzes security risks of binary software code based on its functional context, according to an implementation.
Figure 3:
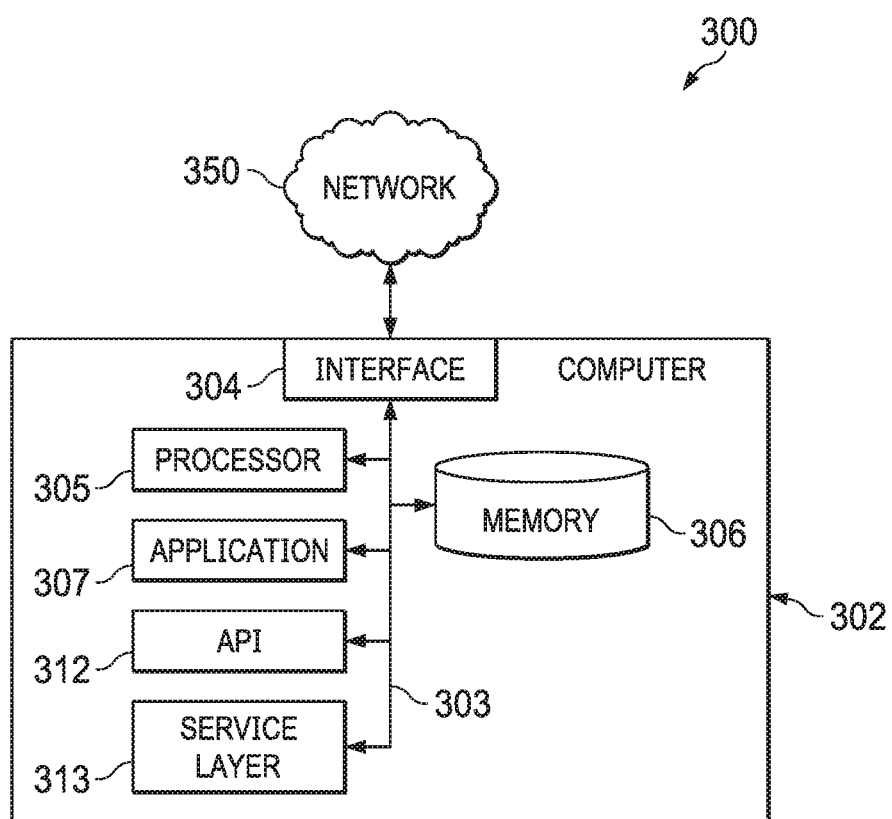
FIG. 3 is a high-level architecture block diagram of a computing system, according to an implementation.

In some implementations, a set of binary software code can be analyzed to determine a functional context. The set of binary software code can be the binary software code of a software program, a portion of a software program, or multiple software programs. The functional context can indicate a function performed by the set of binary software code. The set of binary software code can also be analyzed to assess security risks of the set of binary software code. The security risk assessment of the set of binary software code can be compared with other software codes having a same functional context as the functional context of the set of binary software code. A security notification can be generated to indicate a result of the comparison. This approach provides a better indication of the security risk of the set of binary software code by capturing the relative security level of the set of binary software code according to the function that it performs. FIGS. 1-3 and associated descriptions provide additional details of these implementations.

FIG. 1 is a schematic diagram showing an example communication system 100 that analyzes security risks of binary software code based on its functional context, according to an implementation. At a high level, the example communication system 100 includes a client device 102, a software developer device 160, and a software service platform 120 that are communicatively coupled with a network 110.

The software developer device 160 represents an application, a set of applications, software, software modules, hardware, or any combination thereof, that can be configured to submit the set of binary software code to the software service platform 120. The set of binary software code can be downloaded to the client device 102 to be exacted on the client device 102. The set of binary software code can also be executed on the software service platform 120 to provide software service to the client device 102. Examples of the software services can include software as a service (SaaS) applications such as SALESFORCE, OFFICE 365, or other software application services.

The software service platform 120 includes a software security analyzer 122 and a security risk assessment database 124. The software security analyzer 122 represents an application, a set of applications, software, software modules, hardware, or any combination thereof, that can be configured to analyze software code for security risks based on functional context. In some implementations, the software security analyzer 122 can determine a functional context of the set of binary software code, determine security risk assessment of the set of binary software code, and compare the security risk assessment with security risk assessments of other software code having the same functional context. FIGS. 2-3 and associated descriptions provide additional details of these implementations.

The security risk assessment database 124 represents an application, a set of applications, software, software modules, hardware, or any combination thereof that can be configured to store security risk assessment of different software code and different functional contexts. In operation, the software security analyzer 122 can query the security risk assessment database 124 to retrieve security risk assessments of software code having a particular functional context. The software security analyzer 122 can also store the security risk assessment and the functional context of the set of binary software code on the security risk assessment database 124. FIGS. 2-3 and associated descriptions provide additional details of these implementations. In some cases, as illustrated, the security risk assessment database 124 can be implemented on the same platform as the software security analyzer 122. Alternatively or additionally, the security risk assessment database 124 can be implemented on a different hardware platform that is accessible to the software security analyzer 122.

The software service platform 120 can be implemented using one or more computers, computer servers, or a cloud-computing platform.

The client device 102 represents a device that can use the set of binary software code. In some cases, the set of binary software code can be installed on the client device 102, e.g., by downloading over the network 110 or copying locally onto the client device 102. Alternatively, the client device 102 can access a software service provided by the set of binary software code. In one example, a browser or a client application can be executed on the client device 102 to communicate service requests and service responses with the software service platform 120 to obtain software services.

In some cases, the client device 102 can be a vehicle. A vehicle can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. In these cases, the set of binary software code to be analyzed can be software code that executes on the client device 102 to perform one or more functions. For example, the set of binary software code can control one of the following subsystems on a vehicle: break, steering, transmission, suspension, ignition, acceleration, navigation, external sensor (e.g., camera, radar, or etc.), internal sensor (e.g., sensor that monitors engine, speedometer, odometer, gas level, oil pressure, water temperature, tire pressure control, or etc.), infotainment (e.g., stereo, radio, display, or etc.), telecommunication (e.g., Bluetooth, Wii, cellular network, or etc.)

Turning to a general description, the client device 102 may also include, without limitation, any of the following: endpoint, computing device, mobile device, mobile electronic device, user device, mobile station, subscriber station, portable electronic device, mobile communications device, wireless modem, wireless terminal, or other electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used interchangeably herein.

The example communication system 100 includes the network 110. The network 110 represents an application, set of applications, software, software modules, hardware, or a combination thereof that can be configured to transmit data messages between the entities in the system 100. The network 110 can include a wireless network, a wireline network, the Internet, or a combination thereof. For example, the network 110 can include one or a plurality of radio access networks (RANs), core networks (CNs), and the Internet. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, the fifth generation (5G), or any other radio access technologies. In some instances, the core networks may be evolved packet cores (EPCs).

A RAN is part of a wireless telecommunication system which implements a radio access technology, such as UMTS, CDMA2000, 3GPP LTE, 3GPP LTE-A, and 5G. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

While elements of FIG. 1 are shown as including various component parts, portions, or modules that implement the various features and functionality, nevertheless, these elements may instead include a number of sub-modules, third-party services, components, libraries, and such, as appropriate. Furthermore, the features and functionality of various components can be combined into fewer components, as appropriate.

FIG. 2 is a flow diagram showing an example method 200 that analyzes security risks of binary software code based on its functional context, according to an implementation. The method 200 can be implemented by a software service platform, e.g., the software service platform 120 shown in FIG. 1. The method 200 shown can also be implemented using additional, fewer, or different entities. Furthermore, the method 200 can be implemented using additional, fewer, or different operations, which can be performed in the order shown or in a different order.

The example method 200 begins at 202, where a set of binary software code is received at the software service platform. In some implementations, the set of binary software code can be submitted to the software service platform by a software developer, over a network. The set of binary software code can represent an application software, a system software (e.g., an operating system or a device driver), or a component thereof. In some cases, metadata associated with the set of binary software code can be received at the software service platform. The metadata can be included in the same file as the set of binary software code, e.g., in a header. The metadata can also be included in a separate file, e.g., a software manifest. The metadata can include information of the set of binary software code, including, e.g., the software language used to program the set of binary software code, the computing architecture that executes the set of binary software code, the compiler that was used to compile the source code version of the set of binary software code, the functionality of the set of binary software code, or other information. In some cases, such information of the set of binary software code can be inputted by a software developer through a user interface displayed at the software developer device, and sent to the software service platform when the set of binary software code is submitted to the software service platform.

At 204, the functional context of the set of binary software code is determined. The functional context indicates the function performed by the set of binary software code. In one example, the set of binary software code targeted to be executed on a vehicle. In this case, the functional context can indicate the particular automotive function that the set of binary software code performs, or the particular automotive component on the vehicle that can be controlled by the set of binary software code. For example, the functional context of the set of binary software code can be break control, steering control, transmission control, suspension control, ignition control, acceleration control, navigation control, external sensor control (including control of individual external sensors such as camera control, radar control, and etc.), internal sensor control (including control for monitoring individual internal components such as engine control, speedometer control, odometer control, gas level control, oil pressure control, water temperature control, tire pressure control, and etc.), infotainment control (including control for different infotainment devices such as stereo control, radio control, display control, and etc.), telecommunication control (including e.g., Bluetooth control, WiFi control, cellular network control, and etc.).

In some cases, the functional context can be determined based on metadata that is received with the set of binary software code. For example, the software developer can enter the function that is performed by the set of the binary software code, in a file or through a user interface, and send to the software service platform. The software service platform can perform a keyword search on the metadata to match these functions with a list of functional context, and determine the functional context of the set of binary software code based on the matching.

In some cases, the functional context may not be available at the software service platform. For example, the metadata may not be received at the software service platform, or the metadata may not include the functions performed by the set of binary code. In these or other cases, the software service platform can determine the functional context by disassembling the set of binary software code.

The software service platform can disassemble the set of binary software code into a set of assembly code. Unlike the source code of a software, assembly code is the low-level code that is specific to the computing architecture of the electronic device. In some cases, the electronic device disassembles the set of binary software code according to metadata of the set of binary software code. Examples of the metadata that can be used for the disassembling process can include the computing architecture, the compiler that was used to compile the source code version of the set of binary software code, or a combination thereof. Alternatively or in combination, the electronic device can scan the set of binary software code, and determine the computing architecture, the compiler that was used to compile the source code version of the set of binary software code, or a combination thereof, based on the character matching of keywords that can indicate such information.

After dissembling, the software service platform can determine the functional context by scanning the set of assembly code. In some cases, the scanning can be performed to search assembly instructions in accordance with a standardized software protocol or architecture. In one example, AUTomotive Open System Architecture (AUTOSAR) is a standardized software architecture for automotive electronic control units (ECUs). AUTOSAR specifies software modules, interface, and Application Program Interface (API) for software controlling different ECUs. Therefore, the software service platform can scan the set of assembly code, and search for one or more specific assembly instructions that match the software module, interface or APIs specified by AUTOSAR. Accordingly, the software service platform can determine the ECU controlled by the set of binary software code based on the matched assembly instructions, and determine the functional context according to the ECU controlled by the set of binary software code.

In some cases, the functional context determination can be augmented by a determination of the computing architecture that executes the set of binary software code, software language used to program the set of binary software code, or a combination thereof. For example, a certain component on a vehicle may use a specific hardware processor, which operates a specific computing architecture. Examples of the computing architecture can include an 8-bit INTEL 8080 computing architecture, an 32-bit Advanced Reduced Instruction Set Computer (RISC) Machine (ARM) architecture, or others. Similarly, a particular software language may be used to program software that controls certain component on a vehicle. Examples of the software language can include JAVA, C/C++, .NET, or others. Therefore, in some implementations, the computing architecture or the software language associated with the set of binary software code can be used to narrow the possible functional contexts to a few candidate functional contexts that match such information, and the functional context of the set of binary software code can be selected from these candidate functional contexts.

At 206, the software service platform determines a security risk assessment of the set of binary software code. The security risk assessment indicates the level of security risk to which the set of binary software code is exposed. In some cases, the security risk assessment can be determined based on the set of binary software code. For example, a set of known patterns for potentially malicious codes can be stored at the software service platform. These patterns can exist in the format of binary codes. The software service platform can thus scan the binary software code and detect the presence of the patterns to determine the existence of security risks. Alternatively or in combination, the security risk assessment can be determined based on the set of assembly code after the software service platform dissembles the set of binary software code. The software service platform can store assembly instructions or assembly instruction sequences that are may be potentially malicious, or may be vulnerable to potential attacks, and determine the security risk assessment accordingly.

In some cases, the security risk assessment can be in the form of a numerical value. The value can be calculated based on the number and severity of security risks identified by the software service platform. For example, the value can be calculated by a weighted formula, where a presence of a particular type of security risk may weigh more heavily than a presence of other types of security risks. The security risk assessment can also be in the form of a quantized level, e.g., determined by quantizing the numerical value into different categories.

At 208, a plurality of security risk assessments of other software code having the same functional context as the functional context of the set of binary software code is retrieved. For example, if the functional context for the set of binary software code is break control, the software service platform can retrieve security risk assessments of other software code that also performs break control.

In some implementations, the security risk assessments of other software code can be stored in a database on the software service platform. Alternatively, the security risk assessments of other software code can be stored in a different computing platform and can be accessed by the software service platform.

At 210, the software service platform compares the security risk assessment of the set of binary software code with the retrieved security risk assessments of other software code that has the same functional context. By comparing the security risk assessment between codes that have the same functional context, the software service platform can provide a better estimation regarding the security risk of the set of binary software code. For example, software code that performs communication functionalities may include network connection instructions, which may be more susceptible to malicious attack. Therefore, if the functional context of the set of binary indicates a communication functionality, e.g., a Bluetooth control, it may have a higher security risk assessment than software code performing other functions. However, its security risk assessment may be relatively low if compared with other software codes whose functional context is also Bluetooth control. In that case, the set of binary software code may have a low security risk.

In some cases, software code having same functional context may be further divided into different categories, and the comparison can be made between software codes having the same category. For example, software code that performs automotive functions can be divided based on the class of vehicles for which the software code is targeted. The classes can include economic and luxury classes, and the software codes having the same functional context and in the same class are compared.

At 212, the software service platform can generate a security notification that indicates the result of the comparison. For example, security notification can indicate that the set of binary software code has a higher security risk, a similar security risk, or a lower security risk than other software codes that have the same functional context. In some cases, the security notification can also indicate the security risk assessment of the set of binary software code, the security risk assessments of other software code having the same functional context, one of more statistical metrics of the security risk assessments of other software code having the same functional context (e.g., average, variance), or any combinations thereof. In the cases where software code that is further divided into classes, the security notification can include information of security risk assessments for the software code within the same class. In some cases, the security notification can also include factors that contribute to the security risk assessment of the set of binary software code. For example, the number and type of vulnerabilities discovered at the step 206.

In some cases, the security notification can be outputted at the software service platform, e.g., displayed on a graphic user interface on the software service platform. This approach enables an enterprise that operates the software service platform to be informed of security risks of the software submitted to the platform. In some cases, the enterprise that operates the software service platform can enforce policies regarding the software security of codes on the platform. For example, the software service platform can include, or be coupled with, an app store for a device to download the software code, or a software as a service (SaaS) server that provides software service using the software code. If the security notification indicates that the set of binary software code is relatively unsafe, the software service platform can prevent the set of binary software code from being available to devices for use or download.

Alternatively or additionally, the security notification can be transmitted to the software developer device that submits the set of binary software code. This approach enables the software developer to receive the comparison result of the security risk assessment and make modification accordingly.

In some cases, the software service platform can store the security risk assessment of the set of binary software code associated with the functional context of the set of binary software code in the database discussed previously. Therefore, the security risk assessment of the set of binary software code can be used in comparison with another software code that has the same functional context.

In some cases, the software service platform can aggregate the security risk assessments of different software code for the same device. For example, the software service platform can aggregate the relative security risk assessments of different software codes that execute on the same vehicle, including, e.g., break control, steering control, transmission control, suspension control, ignition control, acceleration control, navigation control, sensor control and etc., and determine an aggregated software security assessment for the vehicle. The aggregated software security assessment can indicate the software security of the vehicle. The software service platform can further compare the aggregated software security assessment of the vehicle with other vehicles and determine the relative software safety level of the vehicle. The software service platform can output the aggregated software security assessment and the relative software safety level, transmit the aggregated software security assessment and the relative software safety level to a different device, or a combination thereof.

FIG. 3 is a high-level architecture block diagram showing a computer 302 coupled with a network 350, according to an implementation. The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 350 facilitates communications between the computer 302 and other devices. In some cases, a user, e.g., an administrator, can access the computer 302 from a remote network. In these or other cases, the network 350 can be a wireless or a wireline network. In some cases, a user can access the computer 302 locally. In these or other cases, the network 350 can also be a memory pipe, a hardware connection, or any internal or external communication paths between the components.

The computer 302 includes a computing system configured to perform the algorithm described in this disclosure. For example, the computer 302 can be used to implement the software security analyzer 122 shown in FIG. 1. The computer 302 can also be used to implement other computing devices, e.g., the software developer device 160 or the client device 102 shown in FIG. 1. In some cases, the algorithm can be implemented in an executable computing code, e.g., C/C++ executable codes. Alternatively, or in combination, the algorithm can be implemented in an application program, e.g., EXCEL. In some cases, the computer 302 can include a standalone LINUX system that runs batch applications. In some cases, the computer 302 can include mobile or personal computers that run the application program.

The computer 302 may include an input device, such as a keypad, keyboard, touch screen, microphone, speech recognition device, or another device that can accept user information, and/or an output device that conveys information associated with the operation of the computer 302, including digital data, visual and/or audio information, or a GUI.

The computer 302 can serve as a client, network component, a server, a database or other persistency, or the like. In some implementations, one or more components of the computer 302 may be configured to operate within a cloud-computing-based environment.

At a high level, the computer 302 is an electronic computing device operable to receive, transmit, process, store, or manage data and information. According to some implementations, the computer 302 may also include or be communicably coupled with an application server, e-mail server, web server, caching server, streaming data server, business intelligence (BI) server, and/or other server.

The computer 302 can receive requests over network 350 from a client application (e.g., executing on a user device) and respond to the received requests by processing said requests in an appropriate software application. In addition, requests may also be sent to the computer 302 from internal users (e.g., from a command console or by another appropriate access method), external or third parties, other automated applications, as well as any other appropriate entities, individuals, systems, or computers.

Each of the components of the computer 302 can communicate using a system bus 303. In some implementations, any and/or all the components of the computer 302, both hardware and/or software, may interface with each other and/or the interface 304 over the system bus 303, using an application programming interface (API) 312 and/or a service layer 313. The API 312 may include specifications for routines, data structures, and object classes. The API 312 may be either computer language-independent or -dependent and refer to a complete interface, a single function, or even a set of APIs. The service layer 313 provides software services to the computer 302. The functionality of the computer 302 may be accessible for all service consumers using this service layer. Software services, such as those provided by the service layer 313, provide reusable, defined business functionalities through a defined interface. For example, the interface may be software written in JAVA, C++, or other suitable language providing data in Extensible Markup Language (XML) format or other suitable format. While illustrated as an integrated component of the computer 302, alternative implementations may illustrate the API 312 and/or the service layer 313 as stand-alone components in relation to other components of the computer 302. Moreover, any or all parts of the API 312 and/or the service layer 313 may be implemented as child or sub-modules of another software module or hardware module, without departing from the scope of this disclosure.

The computer 302 includes an interface 304. Although illustrated as a single interface 304 in FIG. 3, two or more interfaces 304 may be used according to particular needs, configurations, or particular implementations of the computer 302. The interface 304 is used by the computer 302 for communicating with other systems in a distributed environment connected to the network 350—(whether illustrated or not). Generally, the interface 304 comprises logic encoded in software and/or hardware in a suitable combination and operable to communicate with the network 350. More specifically, the interface 304 may comprise software supporting one or more communication protocols associated with communications such that the network 350 or interface's hardware are operable to communicate physical signals.

The computer 302 includes a processor 305. Although illustrated as a single processor 305 in FIG. 3, two or more processors may be used according to particular needs, configurations, or particular implementations of the computer 302. Generally, the processor 305 executes instructions and manipulates data to perform the operations of the computer 302. In some cases, the processor 305 can include a data processing apparatus.

The computer 302 also includes a memory 306 that holds data for the computer 302. Although illustrated as a single memory 306 in FIG. 3, two or more memories may be used according to particular needs, configurations, or particular implementations of the computer 302. While memory 306 is illustrated as an integral component of the computer 302, in alternative implementations, memory 306 can be external to the computer 302.

The application 307 comprises an algorithmic software engine providing functionality according to particular needs, configurations, or particular implementations of the computer 302. Although illustrated as a single application 307, the application 307 may be implemented as multiple applications 307 on the computer 302. In addition, although illustrated as integral to the computer 302, in alternative implementations, the application 307 can be external to the computer 302.

There may be any number of computers 302 associated with, or external to, the system 300 and communicating over network 350. Further, the terms "client," "user," and other appropriate terminology may be used interchangeably, as appropriate, without departing from the scope of this disclosure. Moreover, this disclosure contemplates that many users may use one computer 302, or that one user may use multiple computers 302.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM), or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media, transitory or non-transitory, suitable for storing computer program instructions and data include all forms of non-volatile memory, media and memory devices, including by way of example, semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to, or represent, the functions of the web browser.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a transitory or non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

What is claimed is:

1. A computer-implemented method, comprising:
receiving, by a server, a set of binary software code;
determining, by the server, a particular automotive function performed by the set of binary software code;
determining, by the server, a security risk assessment of the set of binary software code;
retrieving, by the server, a plurality of security risk assessment of other software codes performing a same particular automotive function as the set of binary software code;
comparing, by the server, the security risk assessment of the set of binary software code and the plurality of security risk assessments of other software codes performing the same particular automotive function; and
generating, by the server, a security notification indicating a result of the comparing.

2. The method of claim 1, further comprising:
disassembling, by the server, the set of binary software code into a set of assembly code;
scanning the set of assembly code to determine one or more assembly instructions; and
determining the particular automotive function based the one or more assembly instructions and an AUTomotive Open System Architecture (AUTOSAR) standard.

3. The method of claim 2, wherein the particular automotive function is determined further based on a computing architecture associated with the set of binary software code or a software language used to program the set of binary software code.

4. The method of claim 1, wherein the particular automotive function of the set of binary software code is determined based on metadata associated with the set of binary software code.

5. The method of claim 1, further comprising outputting the security notification on a graphic user interface associated with the server.

6. The method of claim 1, wherein the set of binary software code is received from a client device, and the security notification is transmitted to the client device.

7. The method of claim 1, wherein determining the security risk assessment comprises:
detecting a presence of at least one security vulnerability or an absence of security vulnerability in the set of binary software code; and
determining a value of the security risk assessment based on the presence of the at least one security vulnerability or the absence of security vulnerability.

8. A server, comprising:
at least one hardware processor; and
one or more computer-readable storage media coupled to the at least one hardware processor and storing programming instructions for execution by the at least one hardware processor, wherein the programming instructions, when executed, cause the at least one hardware processor to perform operations comprising:
receiving, by the server, a set of binary software code;
determining, by the server, a particular automotive function performed by the set of binary software code;
determining, by the server, a security risk assessment of the set of binary software code;
retrieving, by the server, a plurality of security risk assessment of other software codes performing a same particular automotive function as the set of binary software code;
comparing, by the server, the security risk assessment of the set of binary software code and the plurality of security risk assessments of other software codes performing the same particular automotive function; and
generating, by the server, a security notification indicating a result of the comparing.

9. The server of claim 8, the operations further comprising:
disassembling, by the server, the set of binary software code into a set of assembly code;
scanning the set of assembly code to determine one or more assembly instructions; and
determining the particular automotive function based the one or more assembly instructions and an AUTomotive Open System Architecture (AUTOSAR) standard.

10. The server of claim 9, wherein the particular automotive function is determined further based on a computing architecture associated with the set of binary software code or a software language used to program the set of binary software code.

11. The server of claim 8, wherein the particular automotive function of the set of binary software code is determined based on metadata associated with the set of binary software code.

12. The server of claim 8, the operations further comprising outputting the security notification on a graphic user interface associated with the server.

13. The server of claim 8, wherein the set of binary software code is received from a client device, and the security notification is transmitted to the client device.

14. The server of claim 8, wherein determining the security risk assessment comprises:
detecting a presence of at least one security vulnerability or an absence of security vulnerability in the set of binary software code; and determining a value of the security risk assessment based on the presence of the at least one security vulnerability or the absence of security vulnerability.

15. One or more non-transitory computer-readable media containing instructions which, when executed, cause a computing device to perform operations comprising:
   receiving, by a server, a set of binary software code;
   determining, by the server, a particular automotive function performed by the set of binary software code;
   determining, by the server, a security risk assessment of the set of binary software code;
   retrieving, by the server, a plurality of security risk assessment of other software codes performing a same particular automotive function as the set of binary software code;
   comparing, by the server, the security risk assessment of the set of binary software code and the plurality of security risk assessments of other software codes performing the same particular automotive function; and
   generating, by the server, a security notification indicating a result of the comparing.

16. The one or more computer-readable media of claim 15, the operations further comprising:
   disassembling, by the server, the set of binary software code into a set of assembly code;
   scanning the set of assembly code to determine one or more assembly instructions; and
   determining the particular automotive function based the one or more assembly instructions and an AUTomotive Open System Architecture (AUTOSAR) standard.

17. The one or more computer-readable media of claim 16, wherein the particular automotive function is determined further based on a computing architecture associated with the set of binary software code or a software language used to program the set of binary software code.

* * * * *

UNITED STATES PATENT AND TRADEMARK OFFICE
CERTIFICATE OF CORRECTION

PATENT NO. : 10,984,102 B2  
APPLICATION NO. : 16/148730  
DATED : April 20, 2021  
INVENTOR(S) : Adam John Boulton Page 1 of 1

It is certified that error appears in the above-identified patent and that said Letters Patent is hereby corrected as shown below:

In the Claims

In Column 13, Line 53, In Claim 2, after "based" insert -- on --.

In Column 14, Line 45, In Claim 9, after "based" insert -- on --.

In Column 16, Line 10 (Approx.), In Claim 16, after "based" insert -- on --.

Signed and Sealed this  
Twenty-second Day of June, 2021

Drew Hirshfeld  
*Performing the Functions and Duties of the*  
*Under Secretary of Commerce for Intellectual Property and*  
*Director of the United States Patent and Trademark Office*